United States Patent

[11] 3,627,793

| [72] | Inventor | Karl Maier<br>Ludwigshafen am Rhine, Germany |
|---|---|---|
| [21] | Appl. No. | 720,353 |
| [22] | Filed | Apr. 10, 1968 |
| [45] | Patented | Dec. 14, 1971 |
| [73] | Assignee | Badische Anilin-& Soda-Fabrik<br>Aktiengesellschaft<br>Ludwigshafen am Rhine, Germany |
| [32] | Priority | Apr. 14, 1967 |
| [33] | | Germany |
| [31] | | P 16 44 468.1 |

[54] ANTHRAQUINONE DYES
2 Claims, No Drawings

[52] U.S. Cl. ............................................. 260/376
[51] Int. Cl. ............................................. C09b 1/50
[50] Field of Search ................................. 260/376

[56] References Cited
UNITED STATES PATENTS

| 2,967,752 | 1/1961 | Buecheler .................. | 260/376 |
|---|---|---|---|

FOREIGN PATENTS

| 721,283 | 1/1955 | Great Britain ............... | 260/376 |
|---|---|---|---|

OTHER REFERENCES

Erikhov et al., As cited in Chem Abstracts, 67, 100983, (1967).

*Primary Examiner*—Lorraine A. Weinberger
*Assistant Examiner*—E. Jane Skelly
*Attorney*—Johnston, Root, O'Keeffe, Keil, Thompson & Shurtleff

ABSTRACT: 1-amino-4-hydroxyanthraquinones containing in the 2-position a carboxyl group esterified by diols having four to 10 carbon atoms.

ANTHRAQUINONE DYES

This invention relates to new anthraquinone dyes which are outstandingly suitable for dyeing or printing synthetic textile material. The new dyes have the formula:

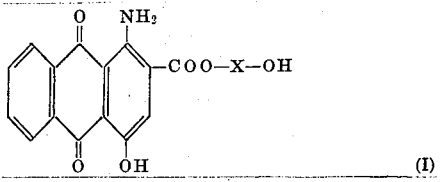

in which X denotes a saturated hydrocarbon radical having four to 10 carbon atoms.

In the formula (I), —XOH may for example denote one of the radicals:

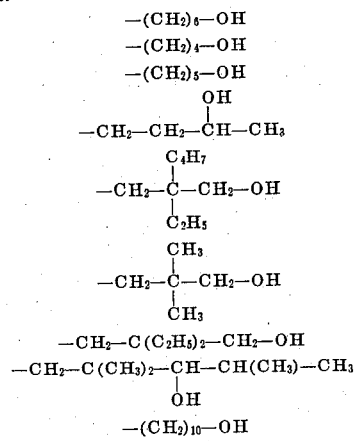

and

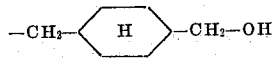

The new dyes are prepared by reacting 1-amino-4-hydroxyanthraquinone-2-carboxylic acid derivatives of this carboxylic acid with diols having the formula HO—XOH with esterification of the carboxyl group.

The starting compound used may be 1-amino-4-hydroxyanthraquinone-2-carboxylic acid or acid derivatives of this carboxylic acid such as the corresponding carboxylic acid halides or carboxylic acid esters.

In the diols having the formula HO—X—OH, the hydrocarbon radical X may be for example a linear, branched or cyclic saturated hydrocarbon radical. The following diols are given by way of example: hexanediol-(1,6), butanediol-(1,4), pentanediol-(1,5), butanediol-(1,3), 2-butyl-2-ethylpropanediol-(1,3), neopentyl glycol, 2,2-diethylpropane-diol-(1,3), 2,2,4-trimethylpentanediol-(1,3), decanediol-(1,10) and trans-hexahydroterephthalyl alcohol.

The 1-amino-4-hydroxyanthraquinone-2-carboxylic acid or derivative of this acid is reacted with the diol by a conventional method of esterification, for example by heating the 1-amino-4-hydroxyanthraquinone-2-carboxylic acid with the appropriate diol in the presence of an esterification catalyst at a temperature of from 110° to 130° C. It is advantageous to use an excess, for example four to 10 times the weight of diol with reference to the anthraquinone carboxylic acid.

The carboxyl group in the 2-position in the 1-amino-4-hydroxyanthraquinone-2-carboxylic acid may also be esterified by first converting the acid into the corresponding isatoic anhydride with phosgene followed by reaction of the anhydride with the appropriate diol at a temperature of from 130° to 160° C. The reaction may be carried out in an excess of diol or in a solvent which is inert under the reaction conditions, such as chlorobenzene or xylene, and in the presence of a small amount of an organic base such as pyridine. The said isatoic anhydride may be prepared for example by heating the anthraquinone carboxylic acid with phosgene in a solvent which is inert under the reaction conditions such as chlorobenzene or dichlorobenzene at 130° to 150°C.

The new dyes are outstandingly suitable for dyeing or printing synthetic textile material, particularly linear polyester textile material. These dyes or mixtures of these dyes give for example on polyester material bright violet dyeings or prints having excellent light fastness, wet fastness and abrasion fastness and also good fastness to heat setting. The new dyes are superior to the dyes known from U.S. Pat. No. 2,823,212 especially in fastness to heat setting and light fastness, and superior to the dyes known from British Pat. No. 721,283 in the color strength of the dyeings obtained on polyester cloth.

The invention is illustrated by the following examples. The parts specified in the examples are parts by weight.

EXAMPLE 1

Twenty parts of 1-amino-4-hydroxyanthraquinone-2-carboxylic acid is heated with 80 parts of hexanediol-(1,6) and 4 parts of p-toluene-sulfonic acid for 18 hours at 120° C. and then allowed to cool. One hundred parts of methanol is added, the whole is cooled and the residue is suction filtered and washed with methanol. Twenty-one parts of the dye having the formula:

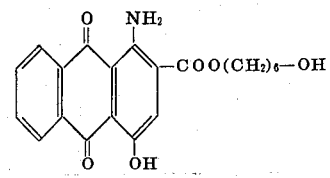

is obtained which has a melting point of 135° to 136° C. (recrystallized from xylene).

EXAMPLE 2

One hundred parts of isatoic anhydride (prepared identical 1-amino-4-hydroxyanthraquinone-2-carboxylic acid and phosgene) is heated with hexanediol-(1,6) under reflux in 300 parts of xylene and in the presence of 5 parts of pyridine for 4 to 5 hours. The whole is suction filtered while hot, the filtrate is allowed to cool and the dye is suction filtered. Eighty-five parts of dye is obtained which is identical with the dye obtainable according to example 1. Similar dyes are obtained when the diols specified in the following table are used. The following abbreviations are used in the table:

E = Example No.;
m.p. = Melting point of the dye in °C.;
Solvent = solvent used for the recrystallization.

TABLE

| E | Diol | M.P. | Solvent |
|---|---|---|---|
| 3 | Butanediol-(1,3) | 149–150 | Benzene. |
| 4 | Butanediol-(1,4) | 133.5–134 | Do. |
| 5 | 2,2-dimethylpropanediol-(1,3) | 217–218 | Toluene |
| 6 | 2,2-diethylpropanediol-(1,3) | 180–181 | Do. |
| 7 | 2-butyl-2-ethylpropanediol-(1,3) | 108–109 | Benzene. |
| 8 | 2,2,4-trimethylpentanediol-(1,3) | 184–185 | Toluene. |
| 9 | Decanediol-(1,10) | 121–122 | Do. |
| 10 | 2,2-dimethylhexanediol-(1,3) | 136–137 | Butanol. |
| 11 | Hexahydroterephthalyl alcohol | 169–170 | Chlorobenzene. |

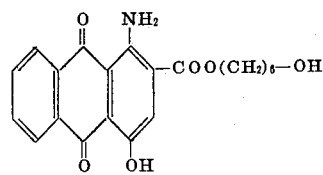

We claim:

1. An anthraquinone dye having the formula:

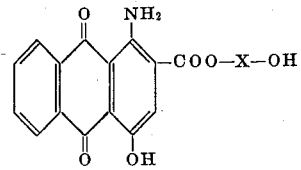

in which X denotes a saturated hydrocarbon radical having four to 10 carbon atoms.

2. The dye having the formula: